(12) United States Patent
Mazzocco et al.

(10) Patent No.: US 8,784,166 B2
(45) Date of Patent: Jul. 22, 2014

(54) HEATING, VENTILATING AND AIR-CONDITIONING APPARATUS

(75) Inventors: Nicholas Mazzocco, Clawson, MI (US); Jason Hendry, Milford, MI (US); David Korenchuk, Royal Oak, MI (US); Delomer Gosioco, Royal Oak, MI (US)

(73) Assignees: DENSO International America, Inc., Southfield, MI (US); Honda Motor Co., Ltd., Tokyo (JP)

( * ) Notice: Subject to any disclaimer, the term of this patent is extended or adjusted under 35 U.S.C. 154(b) by 894 days.

(21) Appl. No.: 12/749,847

(22) Filed: Mar. 30, 2010

(65) Prior Publication Data

US 2011/0244778 A1 Oct. 6, 2011

(51) Int. Cl.
| | | |
|---|---|---|
| *B60H 1/30* | (2006.01) | |
| *B60H 1/32* | (2006.01) | |
| *B60H 1/34* | (2006.01) | |
| *F25B 1/00* | (2006.01) | |
| *B60H 3/00* | (2006.01) | |
| *G05B 15/00* | (2006.01) | |

(52) U.S. Cl.
USPC .......................... 454/155; 454/156; 700/276

(58) Field of Classification Search
CPC .. B60N 3/104; B60H 1/0055; B60H 1/00592; B60H 1/00564
USPC ................... 454/141–143, 155, 156; 700/276
See application file for complete search history.

(56) References Cited

U.S. PATENT DOCUMENTS

| | | | | |
|---|---|---|---|---|
| 6,116,329 | A * | 9/2000 | Arold | 454/156 |
| 6,231,437 | B1 * | 5/2001 | Loup et al. | 454/156 |
| 7,108,599 | B2 * | 9/2006 | Kachi | 454/121 |
| 7,540,321 | B2 * | 6/2009 | Simmet et al. | 165/203 |
| 2002/0139513 | A1 * | 10/2002 | Natsume et al. | 165/42 |
| 2003/0201096 | A1 * | 10/2003 | Perry et al. | 454/156 |
| 2005/0204763 | A1 * | 9/2005 | Smith | 62/239 |

(Continued)

FOREIGN PATENT DOCUMENTS

| | | | |
|---|---|---|---|
| DE | 3641568 A | * | 6/1988 |
| DE | 199 28 586 | | 12/2000 |

(Continued)

OTHER PUBLICATIONS

Yang, KR10-2005-0061666A English machine translation, Jun. 23, 2005.*

(Continued)

*Primary Examiner* — Kang Hu
*Assistant Examiner* — Phillip E Decker
(74) *Attorney, Agent, or Firm* — Harness, Dickey & Pierce, P.L.C.

(57) ABSTRACT

An HVAC system is provided for use in a vehicle having a passenger compartment volume. The HVAC system includes a HVAC housing having a duct opening formed in an exterior sidewall thereof. An evaporator is further provided for exhausting air downstream that is cooler than the air on the upstream side. An auxiliary compartment, such as a storage bin, is spaced apart from the HVAC housing, such as in a remote location of the passenger compartment. An auxiliary duct fluidly interconnects the HVAC housing and the auxiliary compartment via the duct opening for transmitting the cool exhausted air to the auxiliary compartment to provide a cooling effect within the auxiliary location. The auxiliary duct, in some embodiments, is disposed external from the HVAC housing for improved service and retrofitting to existing HVAC systems.

20 Claims, 5 Drawing Sheets

(56) References Cited

U.S. PATENT DOCUMENTS

| | | | |
|---|---|---|---|
| 2007/0101741 A1* | 5/2007 | Kukucka et al. | 62/244 |
| 2007/0193716 A1* | 8/2007 | Archibald et al. | 454/145 |
| 2008/0148752 A1* | 6/2008 | Marginean et al. | 62/244 |
| 2009/0098817 A1* | 4/2009 | Goto | 454/145 |
| 2011/0121599 A1* | 5/2011 | Goupil et al. | 296/37.12 |

FOREIGN PATENT DOCUMENTS

| | | |
|---|---|---|
| DE | 103 29 438 | 2/2005 |
| GB | 2 201 497 | 9/1988 |
| JP | H11151928 A | 6/1999 |
| JP | 2004196877 A | 7/2004 |
| JP | 2005098421 A | 4/2005 |
| JP | 04057410 B2 | 3/2008 |

OTHER PUBLICATIONS

Office action dated Aug. 1, 2013 in corresponding German Application No. 10 2011 014 407.2.

Office Action dated Feb. 4, 2014 mailed in corresponding Japanese Application No. 2011-054461.

* cited by examiner

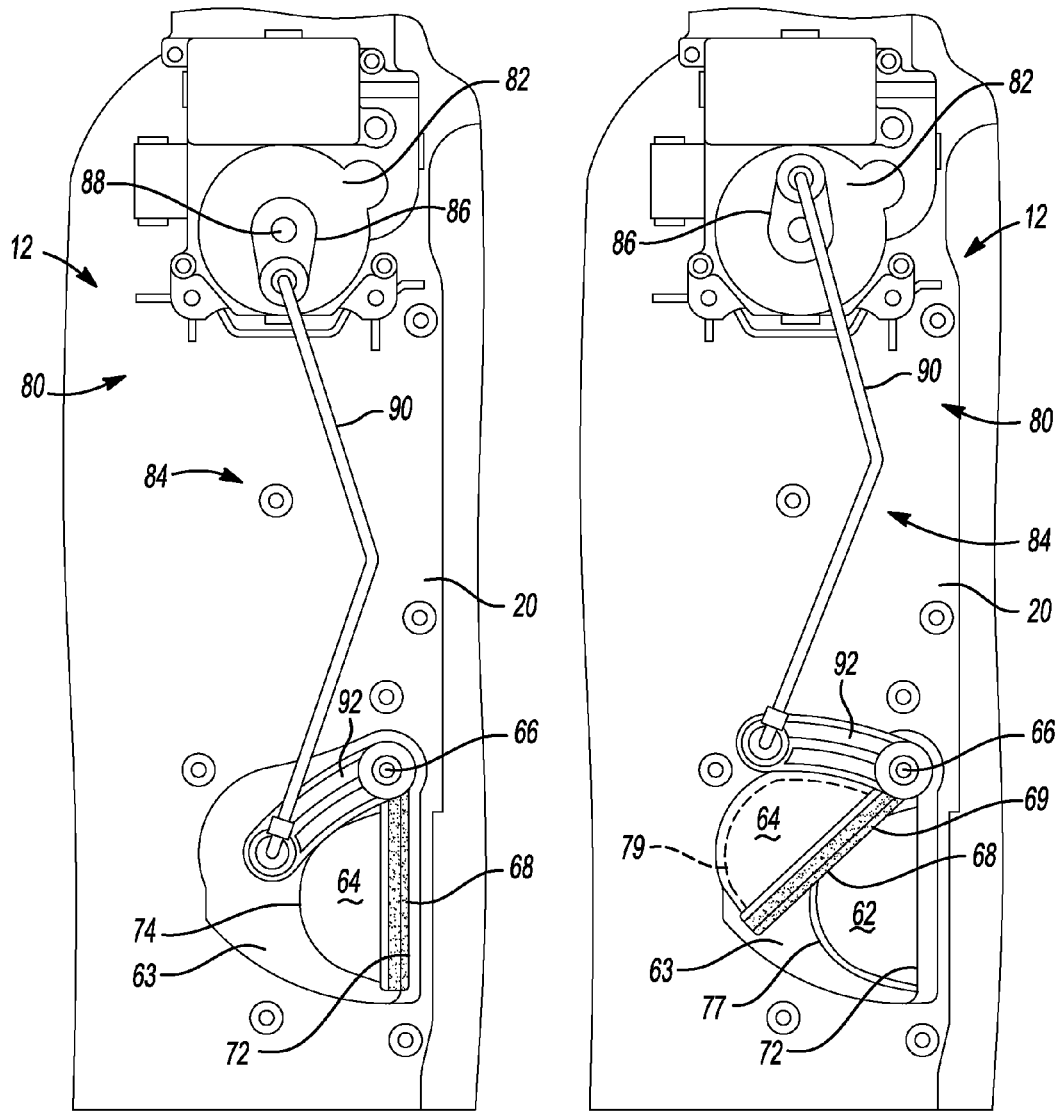

HEATING, VENTILATING AND AIR-CONDITIONING APPARATUS

FIELD

The present disclosure relates to heating, ventilating, and air-conditioning (HVAC) systems in vehicles and, more particularly, relates to an HVAC system for directing conditioned air to a separate cooling/warming bin from an external location of the HVAC housing.

BACKGROUND

This section provides background information related to the present disclosure which is not necessarily prior art.

In automotive vehicles, it is common to have a climate control system located within an instrument panel which provides heated or cooled air to occupants through dash panel defrost air outlets, instrument panel venting air outlets and floor directed air outlets. These traditional climate control systems often include a heater core that performs heat exchange between the engine coolant, which is heated by the engine, and the cool air in the cabin/outside environment, in order to provide warm air to the passenger compartment. Some vehicles include an air conditioning system that cooperates with an evaporator for absorbing heat from the air in the vehicle. The heater core and evaporator are typically provided in an HVAC housing located in the passenger compartment of the vehicle.

In some vehicles, the climate control system is adapted to control three zones of the cabin space. Generally, the three zones include the driver's side, the passenger's side and the rear occupant zone. The HVAC housing typically includes ducting to accommodate air distribution to these appropriate zones as desired. The heater core is generally disposed downstream of a fan for communicating warmed air into the passenger compartment.

More recently, there has been an increased interest in providing temperature-controlled storage within the automotive vehicle. These temperature-controlled storage areas can include glove compartments, coolers, warming bins, and the like that are disposed within the passenger compartment of the vehicle to promote easy access thereto. These temperature-controlled storage areas can be cooled using the conditioned air from the HVAC system. In this regard, cooled air can be ducted to the temperature-controlled storage area to provide an associated temperature controlled environment within the storage area for maintaining an item, such as food or beverages, at a predetermined temperature.

In conventional applications, the ducting and manual temperature control system must be designed and incorporated into the HVAC and other vehicle systems at the time of initial vehicle development to accommodate the necessary space requirements and controls. Therefore, these systems typically can not be retrofitted to existing vehicles.

SUMMARY

This section provides a general summary of the disclosure, and is not a comprehensive disclosure of its full scope or all of its features.

According to the principles of the present teachings, in some embodiments, an HVAC system is provided for use in a vehicle having a passenger compartment volume. The HVAC system includes a HVAC housing having a duct opening formed in an exterior sidewall thereof. An evaporator is further provided having an upstream side and a downstream side, wherein the evaporator accepts air from the upstream side and exhausts air to the downstream side. The exhausted air is cooler than the air on the upstream side. An auxiliary compartment, such as a storage bin, is spaced apart from the HVAC housing, such as in a remote location of the passenger compartment. An auxiliary duct fluidly interconnects the HVAC housing and the auxiliary compartment via the duct opening for transmitting the cool exhausted air to the auxiliary compartment to provide a cooling effect within the auxiliary location. The auxiliary duct is disposed external from the HVAC housing for improved service and retrofitting to existing HVAC systems.

In some embodiments, an HVAC system is also provided for use in a vehicle having a passenger compartment volume. The HVAC system includes a HVAC housing having a duct opening formed in an exterior sidewall thereof. An evaporator is further provided having an upstream side and a downstream side, wherein the evaporator accepts air from the upstream side and exhausts air to the downstream side. The exhausted air is cooler than the air on the upstream side. An air mix door is pivotably coupled within the HVAC housing and generally adjacent to the duct opening. The air mix door and associated HVAC housing sidewall are configured to permit air flow through the duct opening when the air mix door is in the position generally adjacent to the duct opening, which would otherwise obstruct the duct opening. An auxiliary compartment, such as a storage bin, is spaced apart from the HVAC housing, such as in a remote location of the passenger compartment. An auxiliary duct fluidly interconnects the HVAC housing and the auxiliary compartment via the duct opening for transmitting the cool exhausted air to the auxiliary compartment to provide a cooling effect within the auxiliary compartment.

In some embodiments, an HVAC system is also provided for use in a vehicle having a passenger compartment volume. The HVAC system includes a HVAC housing having a duct opening formed in an exterior sidewall thereof. An evaporator is further provided having an upstream side and a downstream side, wherein the evaporator accepts air from the upstream side and exhausts air to the downstream side. The exhausted air is cooler than the air on the upstream side. An auxiliary compartment, such as a storage bin, is spaced apart from the HVAC housing, such as in a remote location of the passenger compartment. An auxiliary duct fluidly interconnects the HVAC housing and the auxiliary compartment via the duct opening for transmitting the cool exhausted air to the auxiliary compartment to provide a cooling effect within the auxiliary compartment. An actuatable door selectively interrupts fluid communication along the auxiliary duct, and a control system that is operably coupled to the actuatable door actuates the actuatable door in response to a control input.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is an enlarged side view of the auxiliary system of the present teachings in a closed position, with the auxiliary duct removed for clarity;

FIG. 6 is an enlarged side view of the auxiliary system of the present teachings in an opened position, with the auxiliary duct removed for clarity;

Corresponding reference numerals indicate corresponding parts throughout the several views of the drawings.

DETAILED DESCRIPTION

Figure 1:
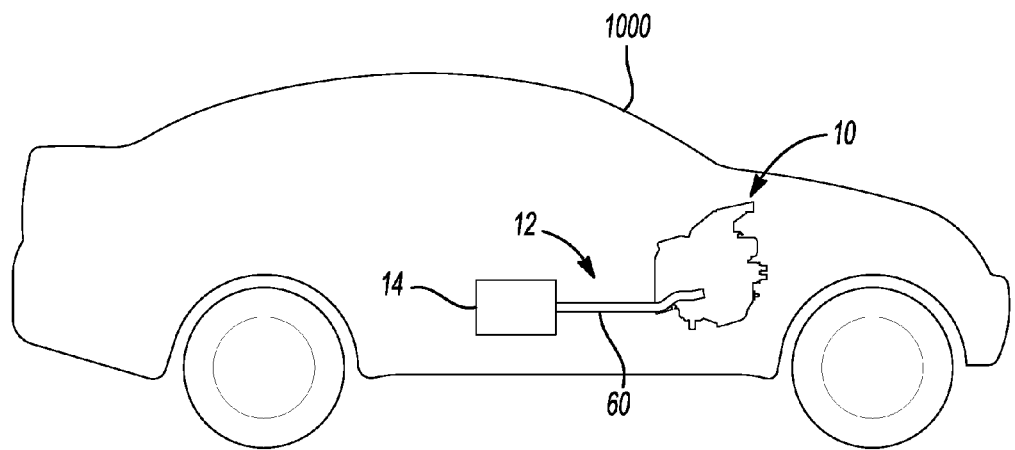
FIG. 1 is an environmental view of a HVAC system according to the principles of the present teachings disposed in a motor vehicle having an auxiliary compartment fluidly coupled to said HVAC system.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With initial reference to FIGS. 1-4, a vehicle HVAC system is illustrated and generally identified at reference 10 according to the principles of the present teachings. In some embodiments, HVAC system 10 can comprise an HVAC housing 20 forming a ventilation duct through which air conditioned and/or heated air is sent into the passenger compartment of the vehicle 1000. HVAC system 10 further comprises an auxiliary system 12 for ducting air conditioned and/or heated air to an auxiliary compartment 14. For the sake of simplicity in the following description, auxiliary compartment 14 may be referred to as coolbox 14. However, it should be appreciated that the present disclosure and accompanying claims should not be limited thereto, unless otherwise noted, as the teachings of the present disclosure provide numerous benefits and advantages when used in conjunction with other receptacles, such as glove compartments, cooling compartments, warming compartments, or any other volumes where a temperature differential relative to the passenger compartment is desired. Accordingly, it should be appreciated that within the description of the present application, auxiliary compartment 14 is intended to include any one of the enumerated volumes or compartments and their equivalents.

It should also be appreciated that the illustrated structure of the present teachings provide a mean to cool the auxiliary compartment 14, by virtue of the placement of the duct opening in the HVAC housing being within a cold air stream. However, it should be recognized that the duct opening can be placed within a warm air stream to provide a heating effect within the auxiliary compartment 14 or a plurality of duct openings and controller(s) could be used to selectively provide both heating and cooling of the auxiliary compartment 14. The present embodiments should not be interpreted to limit the present disclosure.

Figure 2:
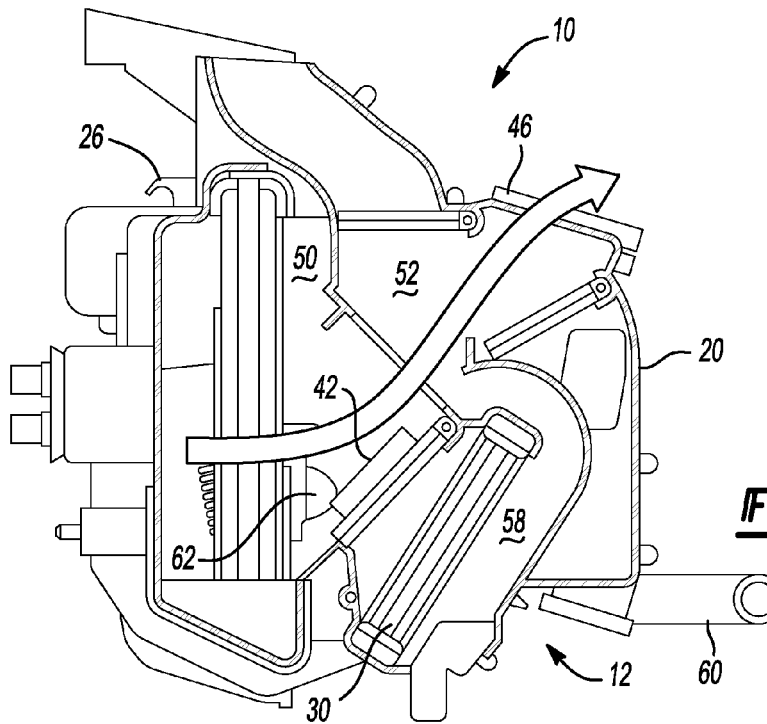
FIG. 2 is a cross-sectional view of the HVAC system illustrating a cooling airflow with a duct opening to the auxiliary compartment being closed.
Figure 3:
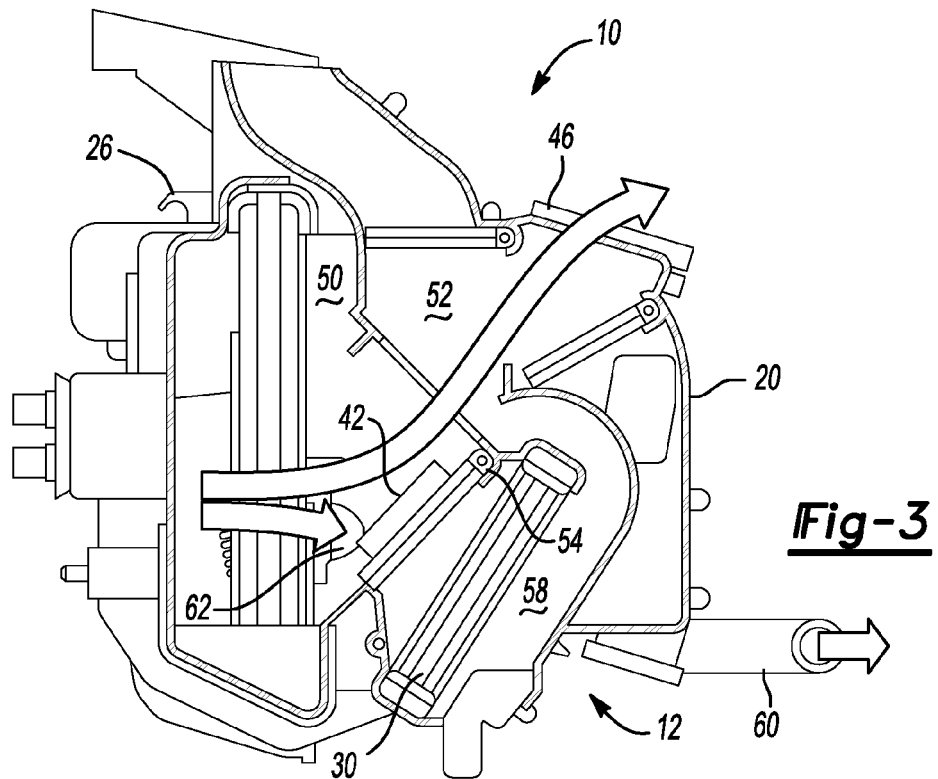
FIG. 3 is a cross-sectional view of the HVAC system illustrating a cooling airflow with a duct opening to the auxiliary compartment being opened.
Figure 4:
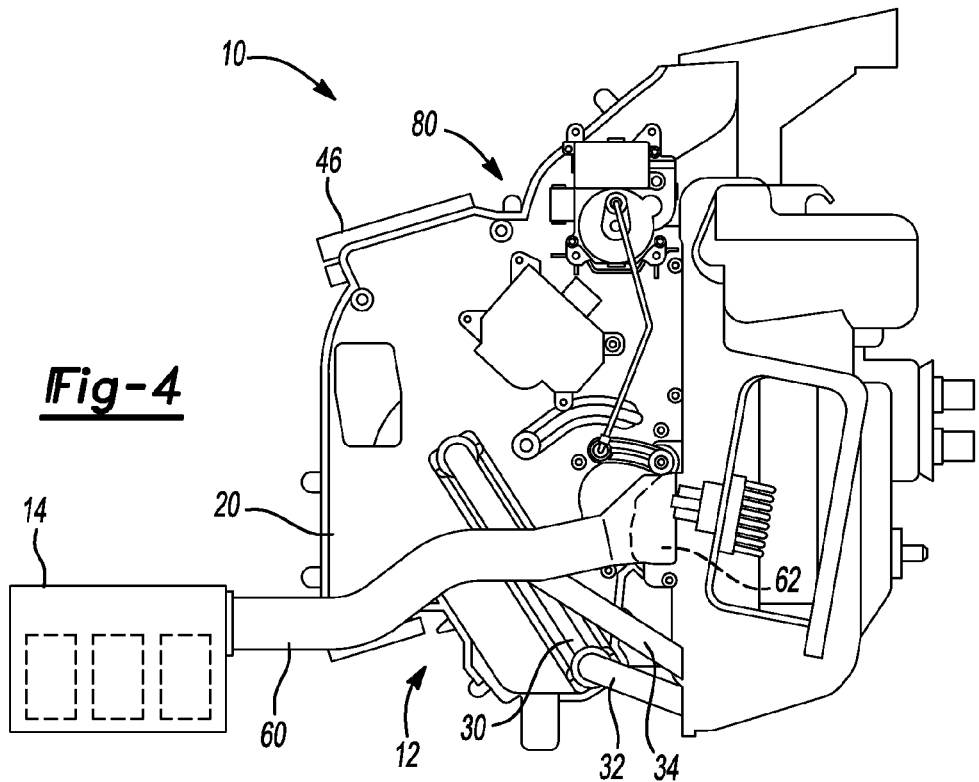
FIG. 4 is a side view of the HVAC system illustrating the HVAC control system, auxiliary duct, and auxiliary compartment according to some embodiments.

With continued reference to FIGS. 2-4, in some embodiments, HVAC system 10 comprises HVAC housing 20 having a conventional fan (not shown) which is arranged on the upstream side of an evaporator 26. Low pressure refrigerant flowing into the evaporator 26 absorbs heat from the air inside the HVAC housing 20 for evaporation. An inside/outside air switch box (not shown) can be arranged on the suction side of the fan. The air inside the passenger compartment (inside air) or the air outside the passenger compartment (outside air) that is switched and introduced through the inside/outside air switch box is sent into the HVAC housing 20 by the fan.

As seen in FIG. 4, in some embodiments the HVAC housing 20 accommodates, on the downstream side of the evaporator 26, a hot water heater core (heat exchanger) 30. The heater core 30 includes an inlet pipe 32 and an outlet pipe 34. Hot water (coolant) of the vehicle engine (not shown) is directed to the heater core 30 through the inlet pipe 32 by a water pump (not shown). A water valve (not shown) may be incorporated to control the flow volume of engine coolant supplied to the heater core 30.

In some embodiments, HVAC system 10 comprises a cool volume area 50 immediately downstream of evaporator 26. When evaporator 26 is operating to provide a cooling effect, the air within cool volume area 50 is cooled below the ambient outside temperature. When evaporator 26 is not operating, the air within cool volume area 50 is generally the same as the ambient outside temperature. In some operating settings, which will be discussed in greater detail herein, air within cool volume area 50 can pass to an intermediate volume 52 downstream of cool volume area 50. Air within intermediate volume 52 can pass to conditioned air outlet 46 for distribution within the passenger compartment or other areas of the vehicle.

Specifically, in some embodiments, a conditioned air outlet 46 can be formed at the downstream end of the HVAC housing 20 in fluid communication with at least intermediate volume 52 and, depending on operating setting, cool volume area 50. Intermediate volume 52 generally comprises air at a desired temperature after being adjusted through volume ratio mixing. As seen in FIGS. 2, 3, 8, and 9, in some embodiments, HVAC system 10 can comprise an air mix door 42 for achieving the desired volume ratio mixing between warm air and cool air. To this end, air mix door 42 is pivotable about an axis 54 and positionable at infinite locations between a first position (see FIGS. 2 and 3) that block airflow from evaporator 26 to heater core 30 and a second position (not shown) that forces all air to pass through heater core 30 prior to exiting conditioned air outlet 46. In this second position, air mix door 42 is pivoted upward about axis 54 and contacts a bypass wall 56, thereby preventing direct air flow from cool volume area 50 to intermediate volume 52 and requiring air to flow from cool volume area 50, through heater core 30, and then into intermediate volume 52 via heater duct 58. Air mix door 42 can further be positioned at any location between the first position and the second position to achieve a specific volume ratio and associated cabin temperature based on heater core temperature and ambient air temperature.

In some embodiments, conditioned air outlet 46 can be controlled and distributed to any combination of face outlets, defroster outlets, foot outlets, rear cabin outlets, and the like, as desired. Typically, the face outlets direct air toward the upper body portions of passengers, the defroster outlets direct air toward the internal surface of a windshield, the foot outlets direct air toward the feet of the front seat passengers and the rear cabin outlets direct air toward the rear seat passengers of the vehicle. Many of these outlets can be servo or mechanically controlled for desired distribution. That is, the air mix door 42 and the outlet mode doors mentioned above can be driven by such electric driving devices as servo motors via linkages or the like.

To achieve cooling of auxiliary compartment 14, a portion of cool air from evaporator 26 within cool volume area 50 can be directed to auxiliary compartment 14 via auxiliary system 12. Auxiliary system 12 can comprise an auxiliary air duct 60 and a duct opening 62 formed in a sidewall 63 of HVAC housing 20 to provide fluid communication of air from within HVAC housing 20 to auxiliary compartment 14. Auxiliary air duct 60 can include a flared end surrounding duct opening 62 to define a generally air-tight ductwork interconnecting cool volume area 50 and auxiliary compartment 14. The flared end can be integrally formed with the remainder of auxiliary air duct 60 or can be formed as a separate and connectable member. It should be understood that in some figures the flared end of auxiliary air duct 60 is removed for clarity.

It should be immediately recognized that auxiliary air duct 60 is disposed at a position external of HVAC housing 20. This arrangement provides several advantages in auxiliary system 12 compared to conventional systems. Specifically, the external positioning of auxiliary air duct 60 and the forming of duct opening 62 in an exterior sidewall of HVAC housing 20 permits auxiliary system 12 to be retrofitted to existing HVAC systems. That is, technicians could install auxiliary system 12 in an existing HVAC system to provide remote cooling (or heating) of an auxiliary compartment 14. This was not previously possible due to the complexity of internals (i.e space limitations) within most HVAC systems and the difficulty of modifying an existing HVAC system to provide conditioned air to a remote location. However, with an external configuration such as in present disclosure, many existing HVAC systems can easily be modified to provide such function by a dealership, repair/modification facility, or perhaps an owner/operator. Moreover, the external positioning of auxiliary system 12 further promotes simplified maintenance and service.

With particular reference to FIGS. 2-7, in some embodiments auxiliary system 12 can comprise an actuatable door 64 operably disposed adjacent auxiliary air duct 60 and pivotable about an axis 66 (FIG. 7) between a closed position (FIGS. 2 and 5) and an opened position (FIGS. 3 and 6). In some embodiments, auxiliary air duct 60 can be shaped as a half-circle (as shown), however alternative shapes can be used. Actuatable door 64 is similarly shaped, such as a D-shape as illustrated, to complement auxiliary air duct 60 and form a reliable seal therebetween.

Conventional HVAC systems employ doors elsewhere that use the air pressure upstream to push against a door to aid in sealing. However, as should be appreciated, the actuatable door 64 of the present teachings is located on an external side of HVAC housing 20. As discussed above, this position minimizes interference with internal components of the HVAC system 10, such as air mix door 42, however air pressure within HVAC housing 20 urges actuatable door 64 outward thereby potentially breaching the seal between actuatable door 64 and auxiliary air duct 60.

Figure 7:
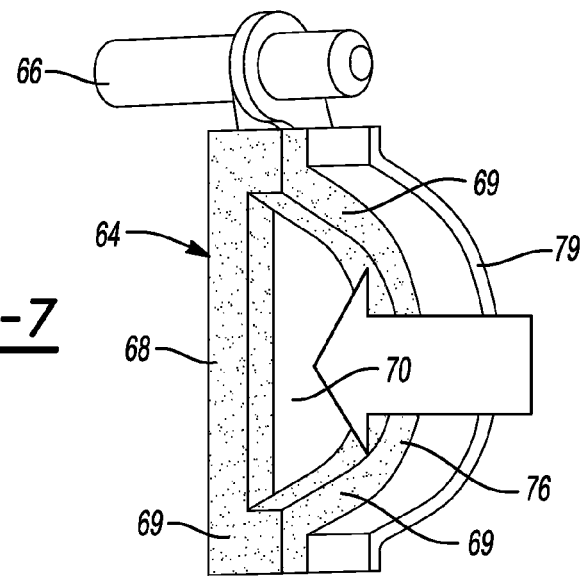
FIG. 7 is a perspective view of an actuatable door viewed from a position within an HVAC case according to some embodiment.

To overcome this condition, actuatable door 64 and HVAC case 20 are provided with improved sealing interface therebetween. Specifically, as seen in FIGS. 6 and 7, the D-shape of actuatable door 64 provides a straight edge surface 68 and a curved portion 76. Straight edge surface 68 is generally orthogonal to a main wall 70 of actuatable door 64. Straight edge surface 68 can be generally enlarged compared to a cross-section of main wall 70 to provide improved contact surface with an opposing wall 72 (FIGS. 5 and 6) of HVAC housing 20. Straight edge surface 68 can engage opposing wall 72 to define a fluid seal therebetween. It should be appreciated that the complementary shape of surface 68 and wall 72 can be varied to include ribs or other features for improved sealing. Moreover, in some embodiments, other sealing members, such as elastomeric members or foam member 69 (shown on FIGS. 5-7), can be coupled to at least one of surface 68 and wall 72 for further improved sealing.

Still referring to FIGS. 6-7, the remaining curved portion 76, having foam seal 69, and a trailing wall 79 along the D-shape portion of actuatable door 64 seals against an upstanding or outwardly-extending wall 77 from HVAC case 20 adjacent opening 62 (see FIG. 6). That is, curved portion 76 and trailing wall 79 of actuatable door 64 can seal through relative contact with the outwardly-extending wall 77 of HVAC case 20, such that with the engagement of surface 68 and wall 72, can collectively define a complete seal about opening 62. This combination provides a simple and reliable seal therebetween generally preventing or at least minimizing unintended airflow therethrough.

With particular reference to FIGS. 5 and 6, in some embodiments, actuatable door 64 can be moved between the closed and opened positions via a control system 80. In some embodiments, control system 80 can comprise a drive unit 82, such as a hydraulic system, electro-mechanical system, servo motor, and the like, operably connected to actuatable door 64 via a linkage assembly 84. Specifically, as seen in FIGS. 5 and 6, linkage assembly 84 can comprise a drive linkage 86 fixedly coupled to an output shaft 88 from drive unit 82 such that drive linkage 86 rotates with output shaft 88. An intermediate linkage 90, having a desired shape to transmit a force output from drive unit 82, can be pivotally coupled at one end to drive linkage 86 and pivotally coupled at an opposing end to a driven linkage 92. Actuatable door 64 can be fixedly coupled to driven linkage 92 for movement therewith between the closed and opened positions or other intermediate position. In this way, control system 80 can be remotely actuated, such as via a manual control or automatic temperature sensor system, to drive unit 82 to rotate output shaft 88 thereby causing drive linkage 86 to rotate and exert a force upon actuatable door 64 via intermediate linkage 90 and driven linkage 92. Actuatable door 64 can be positioned in any location between the closed and opened position to permit fine control of the temperature within auxiliary compartment 14.

It should be understood that the specific arrangement and construction of control system 80 can vary depending on the specific HVAC installation. That is, by way of non-limiting example, the arrangement of drive unit 82 and actuatable door 64 may vary depending on available space within the vehicle. Moreover, the number and shape of the various linkages of linkage assembly 84 may vary based on component interferences and necessary mechanical advantage. Therefore, the specifically described embodiment should not be regarded as limiting the present disclosure.

Figure 8:
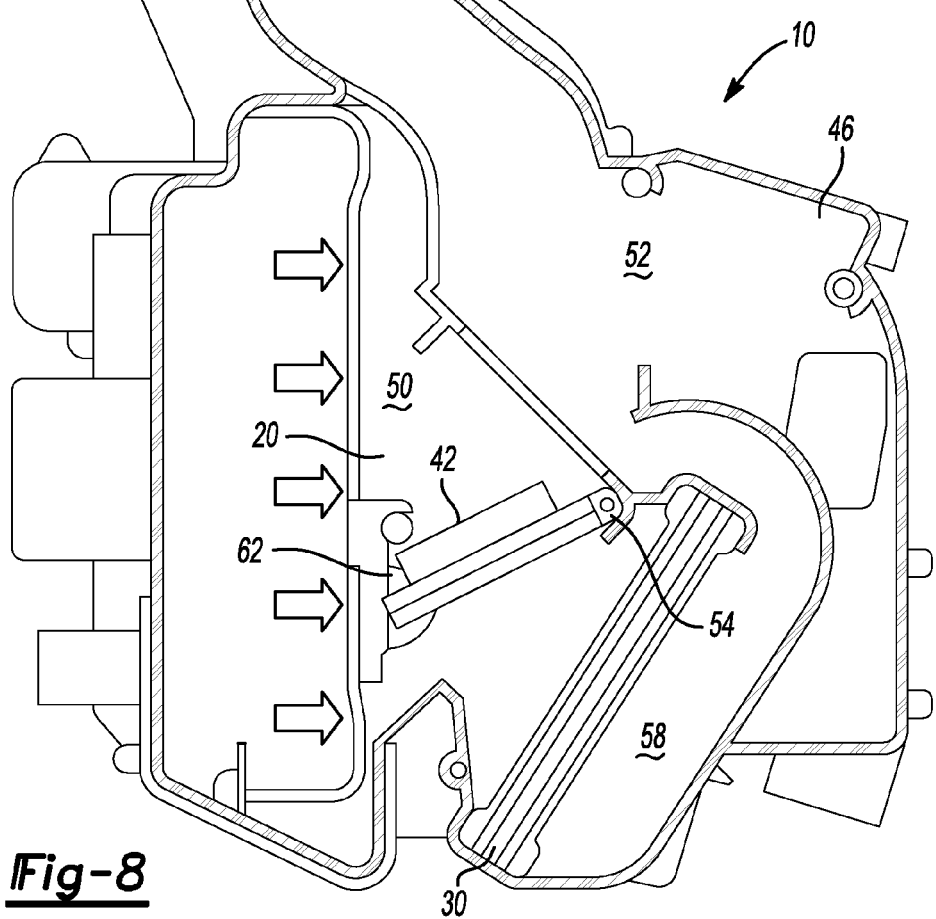
FIG. 8 is a cross-sectional view of the HVAC system illustrating an air mix door generally aligned with the duct opening.
Figure 9:
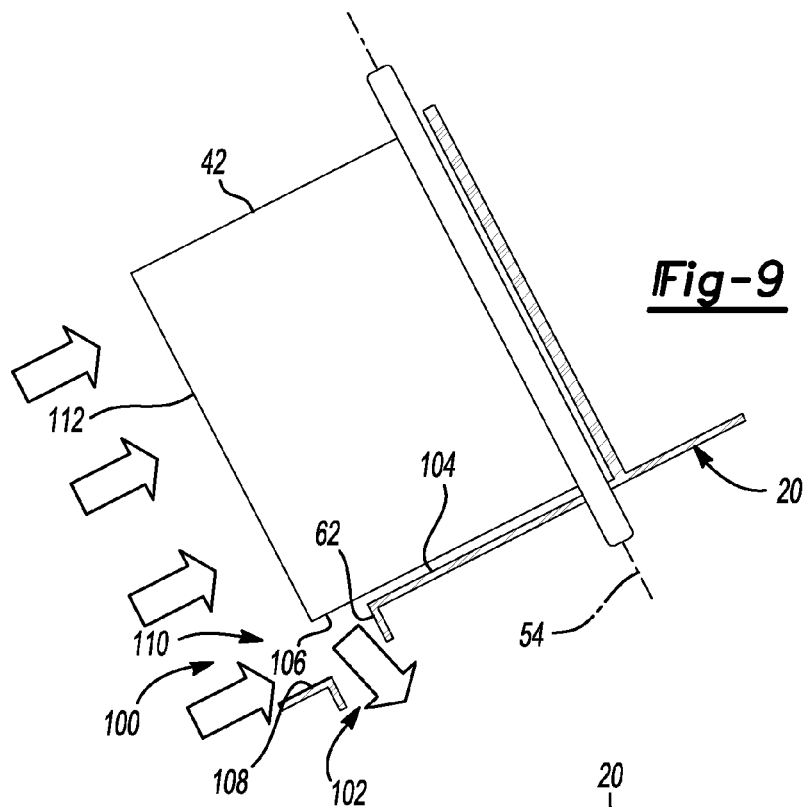
FIG. 9 is a plan cross-sectional view of the air mix door and duct opening.
Figure 10:
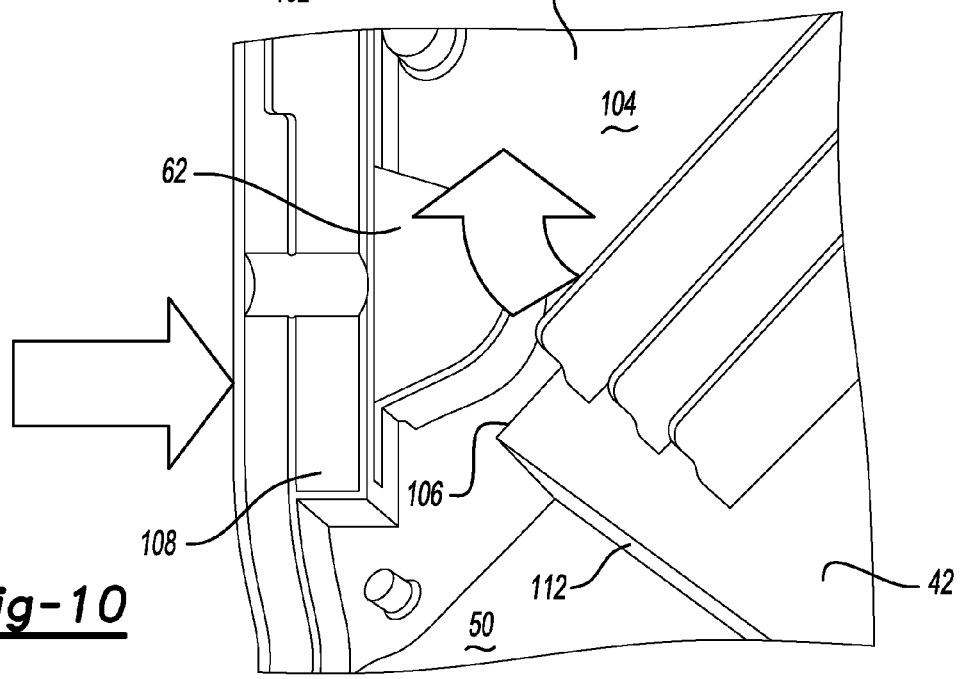
FIG. 10 is an internal perspective view of the air mix door and duct opening.

With particular reference to FIGS. 8-10, it should be recognized that in some installations, the specific location of actuatable door 64 within the sidewall of HVAC housing 20 and thus the associated air flow therethrough may be effected when air mix door 42 is in an intermediate position. That is, with reference to FIG. 8, in some embodiments, air mix door 42 can be positioned at an intermediate position (to obtain the desired temperature within the passenger compartment), wherein this intermediate position at least partially obstructs auxiliary air duct 60. In such cases, air flow to auxiliary compartment 14 may be reduced or otherwise compromised. To overcome such effects in some embodiments, the present teachings provide a scoop or air channel offset 100 to direct air flow toward auxiliary air duct 60 when air mix door 42 is in the illustrated intermediate-obstructing position (FIG. 8). To this end, air channel offset 100 can comprise, in some embodiments, a multi-step sidewall 102 formed in HVAC housing 20. Specifically, multi-step sidewall 102 can comprise a first sidewall portion 104 generally adjacent to a side 106 of air mix door 42 and a second sidewall portion 108 upstream of air mix door 42 and spaced apart therefrom. This close relationship between air mix door 42 and first sidewall portion 104 generally minimizes airflow past air mix door 42 in various positions of air mix door 42. Moreover, this spaced-apart relationship between air mix door 42 and second sidewall portion 108 (denoted by area 110) defines a gap therebetween that permits airflow (indicated by arrows) to flow past a leading edge 112 of air mix door 42 and exit auxiliary air duct 60 when actuatable door 64 is in the opened position. Accordingly, the present teachings provide air channel offset 100 which facilitate airflow from cool volume area 50 to auxiliary compartment 14, even when air mix door 42 is in the otherwise intermediate-obstructing position.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An HVAC system for use in a vehicle, said vehicle having a passenger compartment volume, said system comprising:
   a HVAC housing having an auxiliary duct opening formed in an exterior sidewall thereof, the exterior sidewall including a first portion and a second portion;
   an evaporator having an upstream side and a downstream side, said evaporator accepting air from said upstream side and exhausting air to said downstream side, said exhausting air being cooler than said air on said upstream side, said downstream side being at least partially disposed in said HVAC housing;
   a heating heat exchanger disposed on said downstream side of said evaporator; and
   an air mix door pivotably coupled within said HVAC housing, said air mix door being pivotable to a position immediately adjacent to said auxiliary duct opening, said second portion of the exterior sidewall being offset from said air mix door to define an air channel offset to permit air flow through said auxiliary duct opening when said air mix door is in said position immediately adjacent to said auxiliary duct opening; wherein
   the air mix door is pivotable between a first position prohibiting said exhausting air from flowing through said heating heat exchanger, a second position allowing said exhausting air to flow through said heating heat exchanger, and an intermediate position between the first position and the second position; and
   said exhausting air flowing through said auxiliary duct when said air mix door is in said intermediate position between the first and the second positions.

2. The HVAC system according to claim 1, further comprising:
   an auxiliary compartment spaced apart from said HVAC housing;

an auxiliary duct fluidly interconnecting said HVAC housing and said auxiliary compartment via said auxiliary duct opening for transmitting said exhausting air to said auxiliary compartment, said auxiliary duct being disposed external from said HVAC housing; and an actuatable door selectively interrupting fluid communication along said auxiliary duct.

3. The HVAC system according to claim 2, further comprising:

a control system operably coupled to said actuatable door, said control system actuating said actuatable door in response to a control input.

4. The HVAC system according to claim 3 wherein said control system comprises:

a drive unit operable in response to said control input; and a linkage assembly operably coupled between said drive unit and said actuatable door for positioning said actuatable door at least in an opened position and a closed position, said opened position permit fluid communication between said downstream side and said auxiliary compartment.

5. The HVAC system according to claim 4 wherein said linkage assembly comprises:

a drive linkage fixedly coupled to a drive shaft of said drive unit for rotation therewith;

a driven linkage fixedly coupled to said actuatable door for rotation therewith; and an intermediate linkage pivotally coupled between said drive linkage and said driven linkage for transmitting a force therebetween.

6. The HVAC system according to claim 2 wherein said actuatable door is disposed external from said HVAC housing.

7. The HVAC system according to claim 2 wherein said actuatable door is disposed external from said HVAC housing and adjacent said auxiliary duct opening.

8. The HVAC system according to claim 2 wherein said auxiliary compartment defines a compartment volume separate from the passenger compartment volume.

9. The HVAC system according to claim 1, wherein the auxiliary duct opening is disposed between said evaporator and said heating heat exchanger.

10. An HVAC system for use in a vehicle, said vehicle having a passenger compartment volume, said system comprising:

a HVAC housing having an auxiliary duct opening formed in an exterior sidewall thereof, the exterior sidewall including a first wall and a second wall;

an evaporator having an upstream side and a downstream side, said evaporator accepting air from said upstream side and exhausting air to said downstream side, said exhausting air being cooler than said air on said upstream side, said downstream side being at least partially disposed in said HVAC housing;

a heating heat exchanger disposed on said downstream side of said evaporator;

an air mix door pivotably coupled within said HVAC housing, said air mix door being pivotable to a position immediately adjacent to said auxiliary duct opening, said second wall of the exterior sidewall being offset from said air mix door to define an air channel offset to permit air flow through said auxiliary duct opening when said air mix door is in said position immediately adjacent to said auxiliary duct opening, an auxiliary compartment spaced apart from said HVAC housing; and an auxiliary duct fluidly interconnecting said HVAC housing and said auxiliary compartment via said auxiliary duct opening for transmitting said exhausting air to said auxiliary compartment; wherein said air channel offset comprises:

said first wall of said exterior sidewall being generally adjacent and spaced a first distance from said air mix door, said first wall being downstream of said auxiliary duct opening; and said second wall of said exterior sidewall being upstream of said first wall and upstream of said auxiliary duct opening, said second wall being spaced a second distance from said air mix door, said second distance being greater than said first distance to define said air channel offset;

the air mix door is pivotable between a first position prohibiting said exhausting air from flowing through said heating heat exchanger, a second position allowing said exhausting air to flow through said heating heat exchanger, and an intermediate position between the first position and the second position; and said exhausting air flowing through said auxiliary duct when said air mix door is in said intermediate position between the first and the second positions.

11. The HVAC system according to claim 10 wherein said air channel offset is operable to urge said exhausting air into said auxiliary duct opening.

12. The HVAC system according to claim 10, further comprising:

an actuatable door selectively interrupting fluid communication along said auxiliary duct.

13. The HVAC system according to claim 12, further comprising:

a control system operably coupled to said actuatable door, said control system actuating said actuatable door in response to a control input.

14. The HVAC system according to claim 12 wherein said actuatable door is disposed external from said HVAC housing.

15. The HVAC system according to claim 10, wherein the auxiliary duct opening is disposed between said evaporator and said heating heat exchanger.

16. An HVAC system for use in a vehicle, said vehicle having a passenger compartment volume, said system comprising:

a HVAC housing having auxiliary duct opening formed in an exterior sidewall thereof, the exterior sidewall including a first portion and a second portion;

an evaporator having an upstream side and a downstream side, said evaporator accepting air from said upstream side and exhausting air to said downstream side, said exhausting air being cooler than said air on said upstream side, said downstream side being at least partially disposed in said HVAC housing;

a heating heat exchanger disposed on said downstream side of said evaporator;

an auxiliary compartment spaced apart from said HVAC housing;

an auxiliary duct fluidly interconnecting said HVAC housing and said auxiliary compartment via said auxiliary duct opening for transmitting said exhausting air to said auxiliary compartment;

an actuatable door selectively interrupting fluid communication along said auxiliary duct;

a control system operably coupled to said actuatable door, said control system actuating said actuatable door in response to a control input; and an air mix door pivotably coupled within said HVAC housing, said air mix door being pivotable to a position immediately adjacent to said auxiliary duct opening, said second portion of the exterior sidewall being offset from said air mix door to define an air channel offset to permit air flow through said auxiliary duct opening when said air mix door is in said position immediately adjacent to said auxiliary duct opening; wherein the air mix door is pivotable between a first position prohibiting said exhausting air from flowing through said heating heat exchanger, a second position allowing said exhausting air to flow through said heating heat exchanger, and an intermediate position between the first position and the second position; and said exhausting air flowing through said auxiliary duct when said air mix door is in said intermediate position between the first and the second positions.

17. The HVAC system according to claim 16, wherein said control system comprises:
 a drive unit operable in response to said control input; and
 a linkage assembly operably coupled between said drive unit and said actuatable door for positioning said actuatable door at least in an opened position and a closed position, said opened position permit fluid communication between said downstream side and said auxiliary compartment.

18. The HVAC system according to claim 17 wherein said linkage assembly comprises:
 a drive linkage fixedly coupled to a drive shaft of said drive unit for rotation therewith;
 a driven linkage fixedly coupled to said actuatable door for rotation therewith; and
 an intermediate linkage pivotally coupled between said drive linkage and said driven linkage.

19. The HVAC system according to claim 16 wherein said actuatable door is disposed external from said HVAC housing.

20. The HVAC system according to claim 16, wherein the auxiliary duct opening is disposed between said evaporator and said heating heat exchanger.

* * * * *